May 24, 1932.  J. A. MARTOCELLO  1,859,451
SERIES DROP TUBE
Filed Sept. 17, 1930
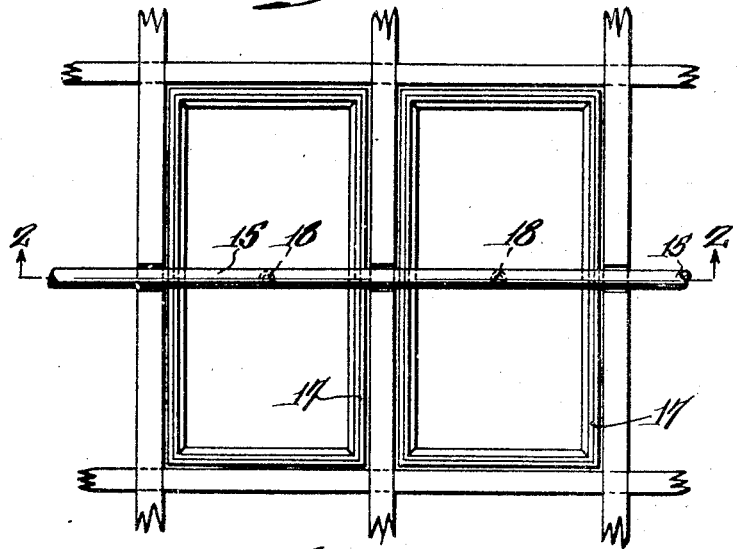
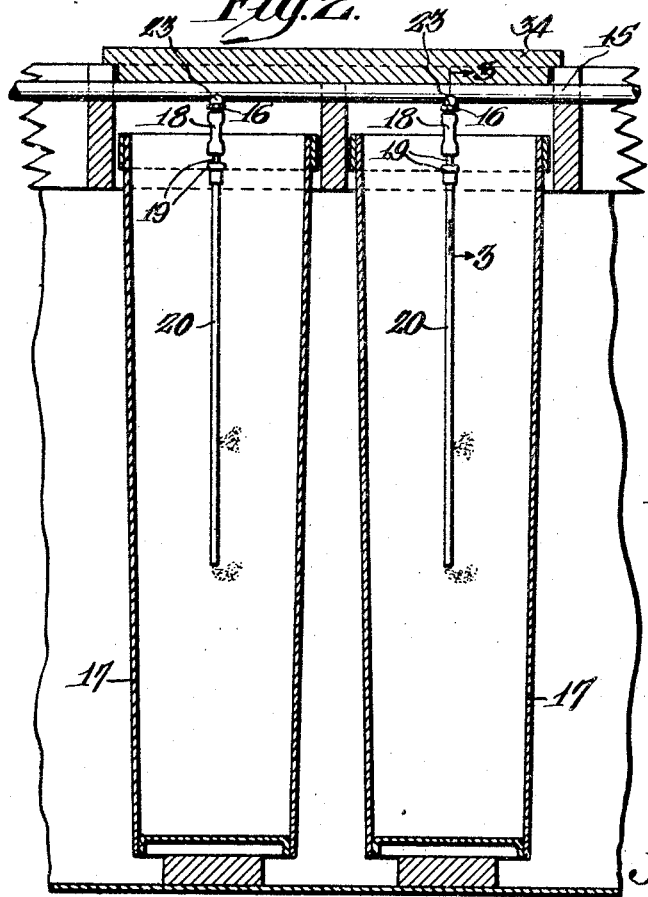
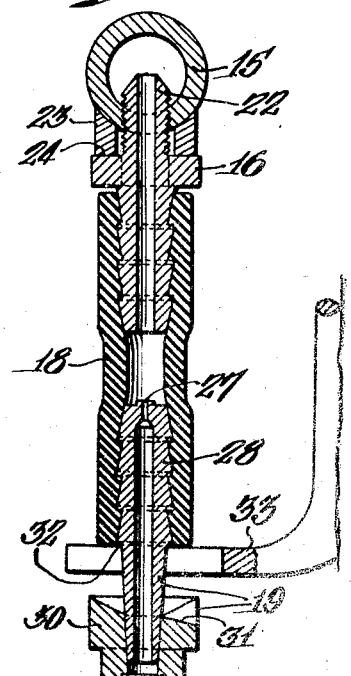
Inventor:
Joseph A. Martocello Patented May 24, 1932

1,859,451

UNITED STATES PATENT OFFICE

JOSEPH A. MARTOCELLO, OF PHILADELPHIA, PENNSYLVANIA

SERIES DROP TUBE

Application filed September 17, 1930. Serial No. 482,496.

My invention relates to the air system of an ice plant and more particularly to the connections between an air lateral and drop tubes hanging from the lateral to dip into ice cans on the freezing floor, the subject matter of the present invention having been already disclosed but not claimed in my copending application, Serial No. 610,081.

A purpose of my invention is to provide an air lateral removably mounted across and above the tops of ice cans on a freezing floor with a novel and desirable form of suspending connection with the drop tubes of the individual cans beneath the lateral.

A further purpose is to provide a downwardly directed flexible connection from an air lateral with a metal plug and socket union with the top of a drop tube dipping into an ice can, providing the flexible hose connection out of the lateral with a terminal having a shank within the lower end of the hose and a downwardly directed taper plug fitting removably into an upwardly directed socket terminal upon the top of the drop tube.

A further purpose is to provide the upper and plug member of a plug and socket union between the upper end of a drop tube and the lower end of a hose from an air lateral with a downwardly directed shoulder adapted to receive a hook for removing the plug from the socket after the freezing operation has been completed.

Further purposes will appear in the specification and in the claims.

I have elected to show one form only of my invention selecting a form that is practical and efficient in operation and which well illustrates the principles involved.

Figure 1 is a broken top plan view illustrating structure embodying my invention.

Figure 2 is a vertical section taken upon the line 2—2 of Figure 1.

Figure 3 is an enlarged section taken upon the line 3—3 of Figure 2 in the direction of the arrows.

Figure 4 is a fragmentary perspective view illustrating a preferred method of disconnecting an air lateral from drop tubes initially suspended therefrom but frozen to place before the disconnection of the lateral.

Like numerals refer to like parts in all figures.

Describing in illustration and not in limitation and referring to the drawings:—

The air lateral 15 is tapped with a hose fitting 16 and supplies the individual cans 17 with agitating air through flexible hose connections 18, plug and socket couplings 19 and air tubes 20 which are thus suspended from the lateral 15.

To keep dirt and scale from entering the tap, I may extend the top shank 22 of the fitting well into the interior of the lateral where the air velocity is at maximum and the quantity of dirt and scale carried by the air a minimum.

Such dirt and scale as is present at the middle of the lateral is too heavy and its velocity too high for it to turn at the abrupt angle requisite for entering the tap along with the relatively very light air. As a result the air enters the tap substantially free from dirt and scale.

I may place a ring 23 of lead or other sufficiently plastic metal between the shoulder 24 of the hose fitting into the lateral 15 to prevent the hose connection from working loose and leaking in service, the soft metal ring support around the shank of the hose fitting giving the fitting adequate support and tightness.

The throttling orifice 27 between the lateral and the air tube 20 is desirably located upon the plug member 28 of the plug and socket coupling 19 giving very easy access to the throttling orifice for cleaning.

The socket member 30 of this coupling is flared to guide the plug or a thawing needle and is drained at 31 to prevent ice from forming at this point.

During the freezing operation the air tubes 20 hang from the transverse lateral 15 which is temporarily across the tops of a number of cans, being fed in any suitable manner from a header or other supply not shown.

The air tubes are connected to the flexible hose connections 18 separably by plug and socket couplings 19 carried by the tap fittings 16 and carrying the plug members 28 of the couplings 19.

I provide the plug 28 with a downwardly directed abutment or shoulder 32, and pull the plug out of the socket after the freezing operation is completed by means of a suitable tool, desirably a bifurcated hook 33.

At the end of the freezing operation the drop tubes are frozen fast and preparatory to removal of the cans to a thawing tank an operator removes the cover 34, pulls out the plugs 28 from the sockets 19 by means of the tool 33, upwardly directed surfaces of the forked hook engaging the downwardly directed shoulder 32 of the plug and then lifts away the lateral 15 from above the cans, to permit removal of the cans either individually or in block as a unit.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In an air system for an ice plant, an air supply pipe, a tap therefrom directed downwardly, a flexible tube connected with the tap, an ice can, an air pipe in the can and a plug and socket union between the pipe and flexible connection, the pipe initially depending from the supply pipe into the can and when frozen in the can to be separated from the supply pipe by pulling the plug from the socket.

2. In an air system for an ice plant, an air supply pipe, a tap therefrom directed downwardly, a flexible tube connected with the tap, an ice can below the tube, an air pipe in the can, and a metal union between the air pipe and flexible tube comprising a socket member mounted on the top of the air pipe and a plug member mounted in the lower end of the flexible tube and having a downwardly directed shoulder for engagement by a lifting tool to pull the plug from the socket after the tube has been frozen to place in the can.

3. In an air system for an ice plant, an air supply pipe, a tap therefrom extending downwardly, a flexible tube connected with the tap, an ice can, an air pipe in the can, a plug having an upwardly directed shank inside the lower end of the flexible tube and a downwardly directed taper end, an upwardly flaring socket mounted on the upper end of the air pipe and adapted to receive and circumferentially fit about the downwardly taper end of the plug and a downwardly directed shoulder at the lower end of the shank to be engaged by a bifurcated hook to disconnect the plug from the socket.

JOSEPH A. MARTOCELLO.